(12) United States Patent
Church et al.

(10) Patent No.: US 7,363,225 B2
(45) Date of Patent: Apr. 22, 2008

(54) COMPRESSING LANGUAGE MODELS WITH GOLOMB CODING

(75) Inventors: Kenneth Church, Seattle, WA (US); Bo Thiesson, Woodinville, WA (US); Edward Hart, Jr., Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 11/159,712

(22) Filed: Jun. 23, 2005

(65) Prior Publication Data
US 2006/0293899 A1    Dec. 28, 2006

(51) Int. Cl.
G10L 15/18    (2006.01)
(52) U.S. Cl. .............................. 704/257; 704/9; 704/10; 704/1; 341/22; 341/176
(58) Field of Classification Search .................... 704/1, 704/8, 9, 10, 257; 341/22, 176; 340/825.69
See application file for complete search history.

(56) References Cited

U.S. PATENT DOCUMENTS

| | | | | |
|---|---|---|---|---|
| 5,325,091 A * | 6/1994 | Kaplan et al. | .................. | 341/51 |
| 5,764,374 A | 6/1998 | Seroussi et al. | ............. | 358/427 |
| 6,092,038 A | 7/2000 | Kanevsky et al. | .............. | 704/9 |
| 6,169,969 B1 * | 1/2001 | Cohen | .......................... | 704/10 |
| 6,665,665 B1 * | 12/2003 | Ponte | ............................. | 707/5 |
| 6,668,092 B1 * | 12/2003 | Sriram et al. | ................ | 382/244 |
| 2002/0018597 A1 | 2/2002 | Kajiwara et al. | ............ | 382/233 |
| 2003/0023420 A1 | 1/2003 | Goodman | ....................... | 704/1 |
| 2003/0074183 A1 * | 4/2003 | Eisele | ............................ | 704/1 |
| 2004/0044534 A1 | 3/2004 | Chen et al. | .................. | 704/501 |
| 2004/0071351 A1 | 4/2004 | Rade | .......................... | 382/232 |
| 2004/0138884 A1 | 7/2004 | Whittaker et al. | ........... | 704/236 |
| 2004/0243411 A1 | 12/2004 | Li et al. | ...................... | 704/251 |

FOREIGN PATENT DOCUMENTS

WO    WO 03/067895    8/2003

OTHER PUBLICATIONS

Senecal, J. et al.; "Length-Limited Variable-to-Variable Length Codes for High Performance Entropy Coding," IEEE Proceedings of the Data Compression Conference, 2004, pp. 1-10.

Zhang, N. and Golomb, S.W. "Polyphase Sequence with Low Autocorrelations," IEEE Transactions on Information Theory, vol. 39, No. 3, May 1993, pp. 1085-1089.

Song, Hong and Golomb S.W.; "Some New Constructions for Simplex Codes," IEEE Transactions on Information Theory, vol. 40, No. 2, Mar. 1994. pp. 504-507.

(Continued)

*Primary Examiner*—Vijay Chawan
(74) *Attorney, Agent, or Firm*—Westman, Champlin & Kelly, P.A.

(57) ABSTRACT

A list of integer values is generated from n-grams of a user input. The list of integer values is sorted. Differences between adjacent integer values in the list are calculated. Each calculated difference is encoded using a Golomb code. A Golomb compressed language model is accessed to identify likely matches.

17 Claims, 6 Drawing Sheets

OTHER PUBLICATIONS

Fan, P.Z. and Darnell, M. Dept. of Electronic Engineering, University of Hull, United Kingom, IEEE Transactions, 1994, pp. 74.

Gabidulin, E.M. et al.; "Autocorrelation of Golomb Sequences," IEEE Transactions of Proc.—Communications, vol. 142, No. 5, Oct. 1995, pp. 281-284.

Robinson, J.P.; "Golomb Rectangles as Folded Rulers," IEEE Transactions on Information Theory, vol. 43, No. 1, Jan. 1997, pp. 290-293.

Seroussi G, and Weinberger, M.J.; "On Adaptive Strategies for an Extended Family of Golomb-type Codes," IEEE Transactions, 1997, pp. 131-140.

Manor, D. and Feder, M.; "An Iterative Technique for Universal Lossy Compression of Individual Sequences," IEEE Transactions, 1997, pp. 141.

Kato, S. et al.; "Structured "Truncated Golomb Code" for Context-Based Adaptive VLC," IEEE Transactions, 2003, pp. 405-408.

Stein, S. and Goharian, N.; "On the Mapping of Index Compression Techniques on CSR Information Retrieval," IEEE Proceedings of the Int'l Conference on Information Technology: Computers and Communications, 2003, pp. 1-4.

Hong, E. and Ladner, R.; "Extended Golomb Codes for Binary Markov Sources," IEEE Proceedings of the Data Compression Conference, 2002, pp. 1.

Szpankowski, W.; "Asymptotic Average Redundancy of Huffman (and Other) Block Codes," IEEE Transactions on Information Theory, vol. 46, No. 7, Nov. 2000, pp. 2434-2443.

PCT Search Report, PCT/US06/22042,filed Jun. 6, 2006.

Lim, K.H. and Tan, S.Y.; "Variations of Golomb Run-Length Codes," National University of Singapore, Singapore. 1992., International Conference on Volume , Issue , Apr. 7-9, 1992 pp. 518-521.

* cited by examiner

COMPRESSING LANGUAGE MODELS WITH GOLOMB CODING

BACKGROUND

The discussion below is merely provided for general background information and is not intended to be used as an aid in determining the scope of the claimed subject matter.

Language models are used in a variety of applications including noisy channel applications such as natural language processing, spell checking, and the like. In natural language applications, a speech recognizer typically works by combining acoustic evidence (channel model) with expectations about what the user is likely to say (language model). One common form of language models is referred to as a tri-gram.

In general, a n-gram is a subsequence of n tokens (words). A tri-gram is a subsequence of 3 tokens. For example, from the phrase "to be or not to be", 8 tri-grams can be generated: "$ $ to", "$ to be", "to be or", "be or not", "or not to", "not to be," "to be $" and "be $ $," where the input string is padded with two special tokens denoted at: "$." Statistics can be applied to such n-grams to estimate a likelihood that a user intended a particular input.

Though a billion words of text used to be considered large, training sets for speech recognition routinely train on ten billion words of text. In general, large language models work well (meaning they have low entropy); however, memory capacity is often limited, especially in mobile devices such as cell phones, personal digital assistants (PDAs), electronic planners, and the like. One technique for addressing the memory situation involves trimming the language model, by removing infrequently used words and uncommon variants. However, removal of such terms reduces the overall effectiveness of the language model, leading to more semantic errors due to inability to match input to words in the trimmed model.

SUMMARY

This summary is provided to introduce in a simplified form some concepts, which are described below in the Detailed Description. This Summary is not intended to identify key features or essential features of the claimed subject matter, nor is it intended to be used as an aid in determining the scope of the claimed subject matter.

In one embodiment, a language model is compressed using Golomb encoding techniques. A list of values is generated from elements of the language model. The list of integer values is sorted, and for each element, a difference between adjacent integer values in the list is calculated. Each calculated difference is encoded using a Golomb code.

In another embodiment, a system for processing user inputs has a user interface, a memory, a Golomb encoder/decoder, and a processor. The user interface is adapted to receive user inputs. The memory is adapted to store information and to store a Golomb compressed language model. The Golomb encoder/decoder is adapted to encode user input and to decode elements of the Golomb compressed language model. The processor is adapted to compare encoded user input against elements of the Golomb compressed language model to identify probable matches.

In another embodiment, a method of decoding user inputs using a Golomb-encoded language model is provided. A user input is divided into a plurality of elements, each of which is encoded using a hash technique. Each encoded element is compared to elements of a Golomb-encoded language model to identify possible matches. Possible matches are analyzed statistically to estimate a likelihood that a possible match is a correct mapping of the user input to the Golomb-encoded language model.

DETAILED DESCRIPTION

Language models are utilized in speech recognition systems, in context sensitive spelling correction systems, in interfaces used to enter Asian characters into computers, and the like. Golomb compression techniques can be applied to user inputs, such as uniform resource locator (URL) data for navigating global computer networks, such as the Internet. Since memory is often limited in practice, especially in mobile platforms such as cell phones, personal digital assistants (PDAs), and the like, compression of the language model can be quite useful, and Golomb coding techniques can be used both to compress a language model and to decode results.

Figure 1:
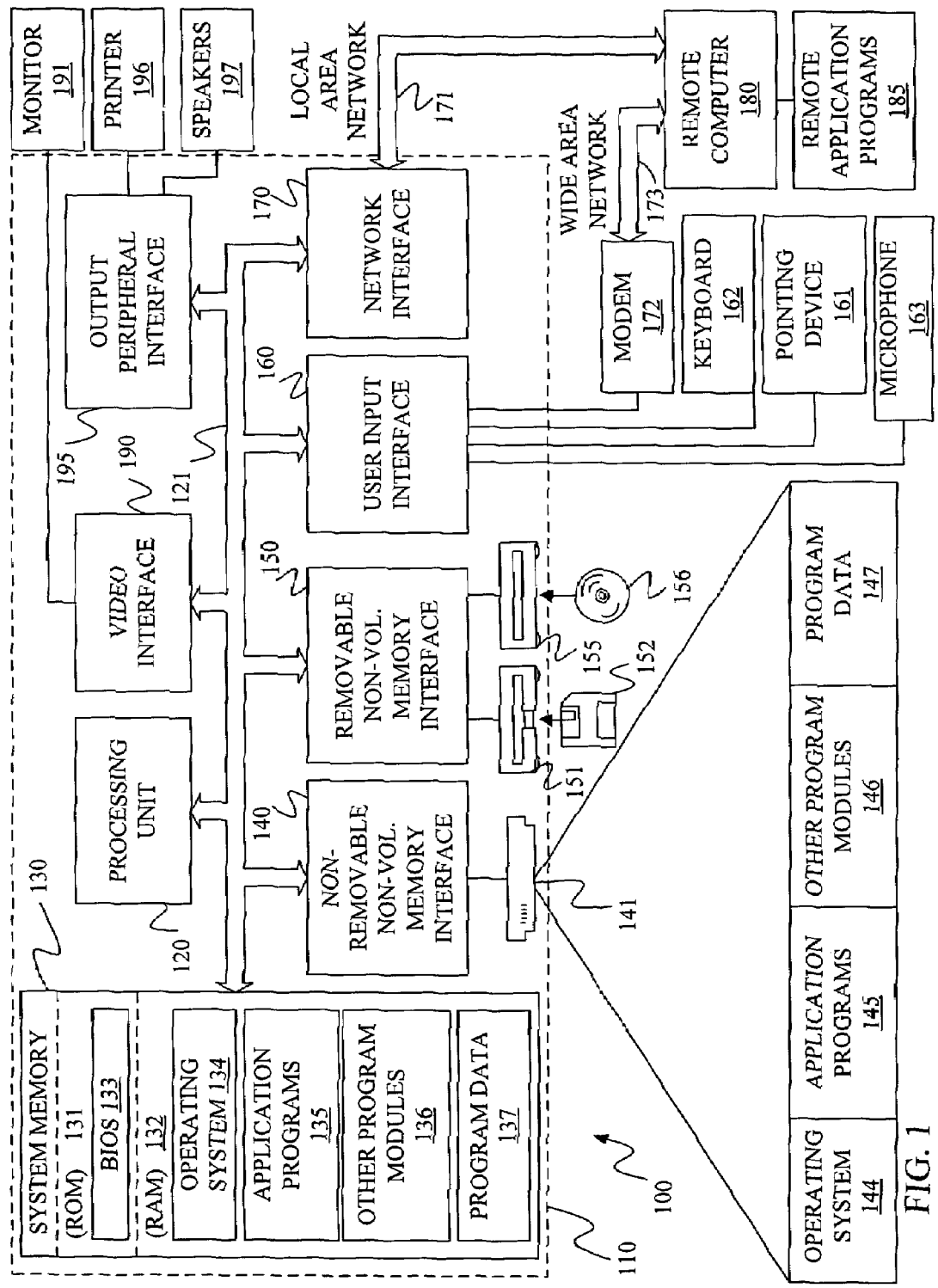
FIG. 1 is a block diagram of one computing environment in which embodiments may be practiced.

FIG. 1 illustrates an example of a suitable computing system environment 100 on which embodiments language model compression techniques may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing an embodiment includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
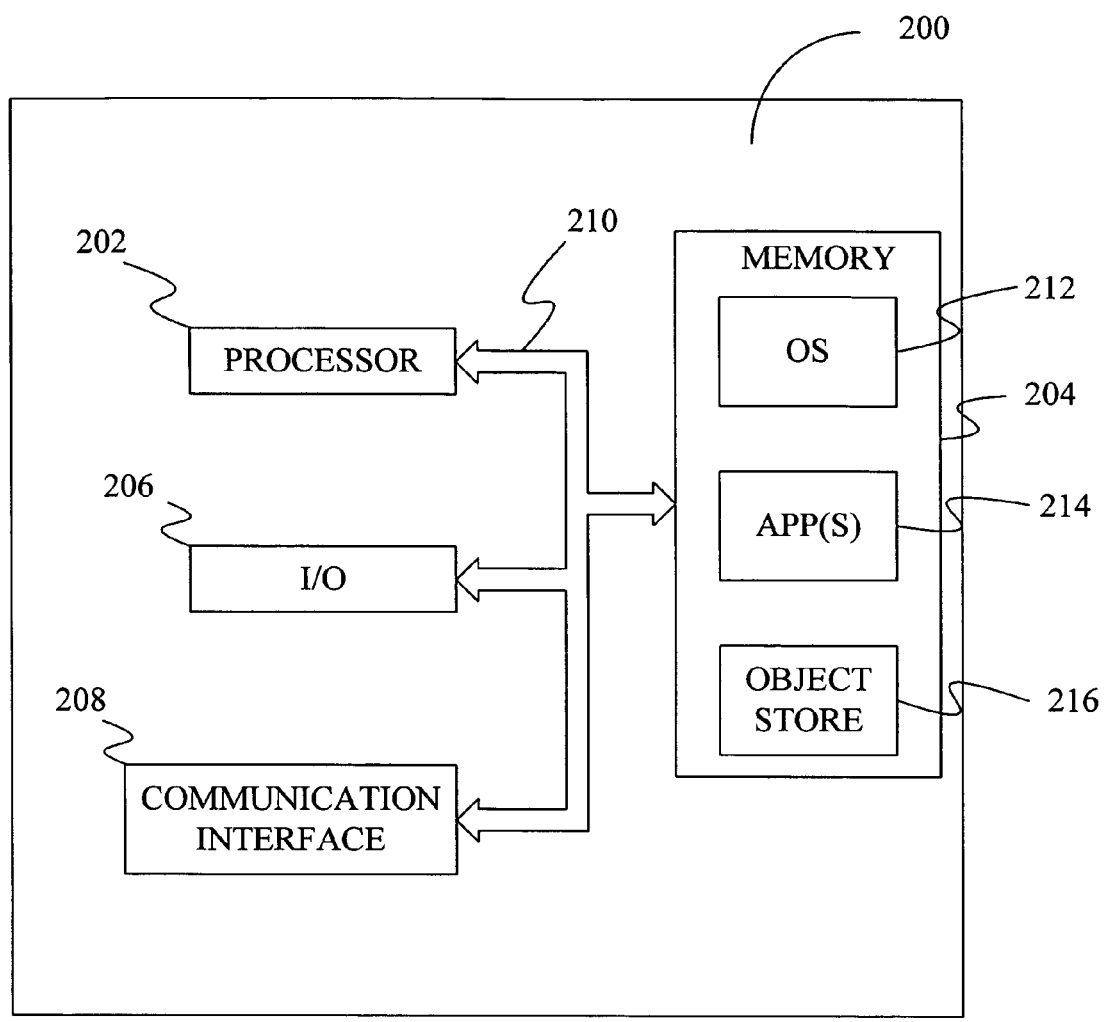
FIG. 2 is a block diagram of an alternative computing environment in which embodiments may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

While pruning of the language model is one possible technique for addressing memory limitations, compression is a more attractive alternative, because it enables storage of more of the original language model in memory.

Figure 3:
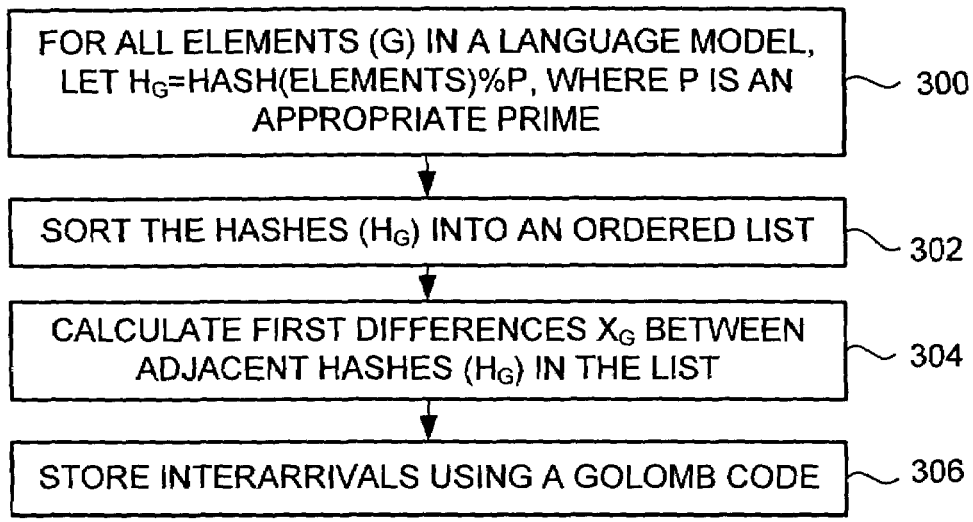
FIG. 3 is a simplified flow diagram of an embodiment of a process for compressing a language model for use in computing devices.

FIG. 3 is a simplified flow diagram of an embodiment of a process for compressing a language model for use in computing devices. A processor hashes elements (such as words, URLs, n-grams and the like) into numerical values, from 1 to P, according to the following equation:

$$H_G = \text{HASH}(\text{element}) \% \text{ P},$$

where P is an appropriate prime. In one embodiment, for example, the numerical values may be integer values. The term integer as used herein refers to whole numbers, which includes all natural numbers, negatives of these numbers, and zero. For all elements in the language model, the processor hashes each element of an input into an integer (step 300). The hash values ($H_G$) are sorted (step 302). The first differences ($X_G$) are calculated between adjacent hashes ($H_G$) in the list (step 304). The interarrivals are stored using a Golomb code (step 306). As used herein, the term "interarrivals" refers to gaps or zeros in the Golomb coded data. For example, interarrivals of a Poisson process have an exponential distribution.

Using this process, the number of memory bits needed to store N elements can be calculated according to the following equation:

$$Mbits = N\left[\frac{1}{\log(2)} + \log_2\left(\frac{P}{N}\right)\right],$$

where N represents the number of elements. The prime P represents a tradeoff between memory usage and loss, such as the lowest prime greater than the result of multiplying N by the average difference desired between successive values. The method is independent of element size, such that long words, URLs, or n-grams are no more expensive than short ones (in terms of memory usage).

Figure 4:
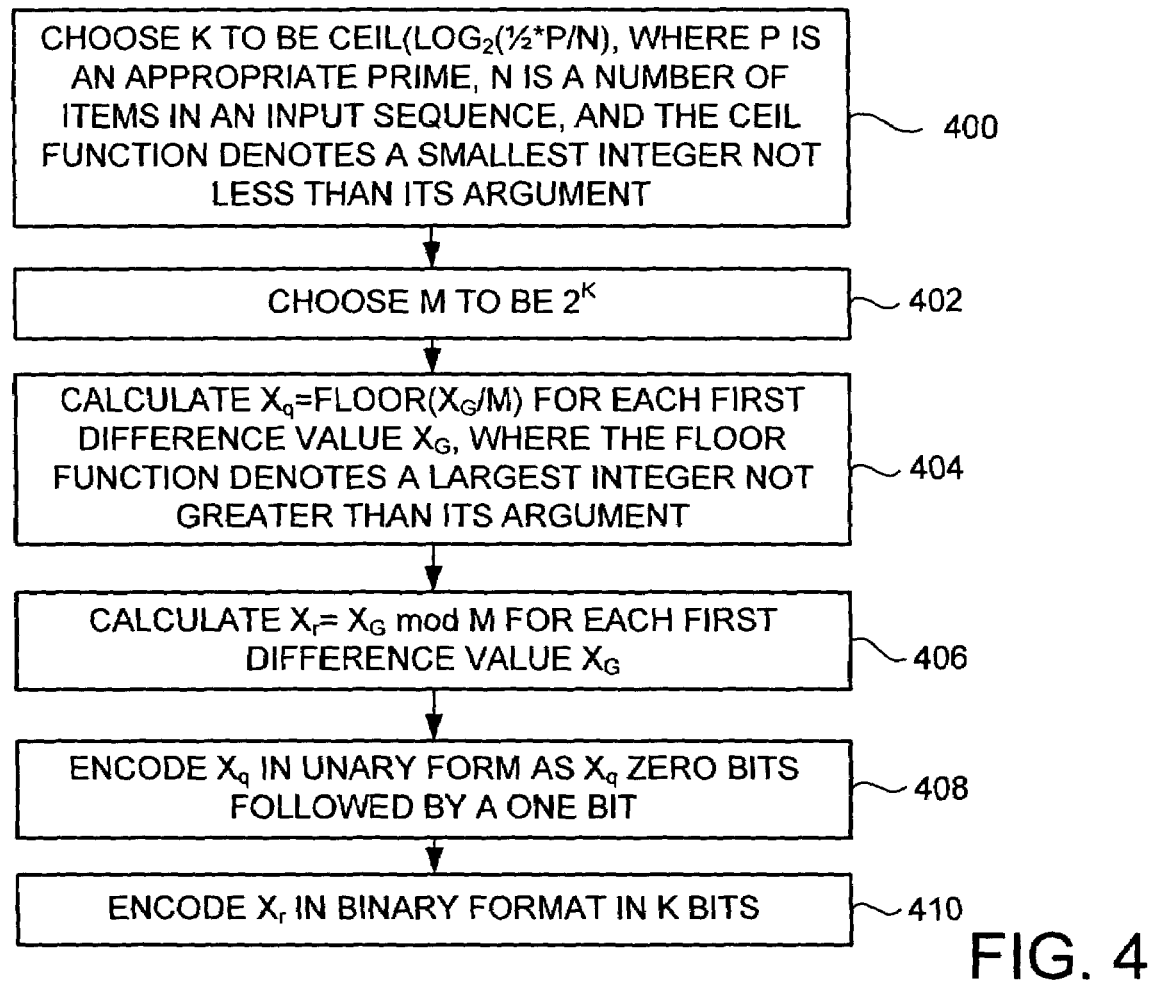
FIG. 4 is a simplified flow diagram of a process for Golomb coding differences between hash values calculated according to the process of FIG. 3.

FIG. 4 is a simplified flow diagram of a process for Golomb coding differences between hash values calculated according to the process of FIG. 3. It should be understood that the flow diagram represents one example of an efficient Golomb coding scheme. Workers skilled in the art will be able to define other ways of computing a quotient and remainder, which will have slightly different characteristics for the memory requirements of the encoding. A value K is chosen according to the following equation:

$$k = ceil\left(\log_2\left(\frac{1}{2} \times \frac{P}{N}\right)\right),$$

where N represents a number of items (such as elements or n-grams) in an input sequence, p represents an appropriate prime larger than N, such as the lowest prime greater than the result of multiplying N by the average difference desired between successive values, and the cell function denotes a smallest integer that is not less than its argument (step 400). A value M is chosen according to the following equation:

$$M = 2^K$$

(step 402). A quotient value $X_q$ is calculated for each first difference value ($X_G$) according to the following equation:

$$X_q = Floor\left(\frac{X_G}{M}\right),$$

where the floor function denotes a largest integer not greater than its argument (step 404). A remainder value $X_r$ is calculated according to the following equation:

$$X_r = X_G \bmod M$$

for each of the first difference values $X_G$ (step 406) The quotient value $X_q$ is encoded in unary format ($X_q$ zero bits followed by a one bit) (step 408). The remainder $X_r$ can be encoded in binary format in K bits (step 410). The Golomb coding technique illustrated in FIG. 4 reduces the memory requirements for storing a language model, such that the quotient value requires $X_q+1$ bits, while the remainder value requires $\log_2 M$ bits.

The sorted hash values can, as a good approximation, be considered as created by a Poisson process. In a Poisson process, the interarrivals have an exponential distribution. In general, the probability can be expressed as follows $$Pr(x) = \lambda e^{-\lambda x}, \text{ where}$$

$$\lambda = \frac{N}{P}$$

and where the variable $\lambda$ represents the interarrivals. The memory usage can then be calculated as follows:

$$H = -\int_0^\infty Pr(x) \log_2 Pr(x),$$

and the memory usage is defined by the following equation:

$$H = \frac{1}{\log_e(2)} + \log_2 \frac{1}{\lambda}.$$

Thus, the memory usage is independent of the size of the elements. This indicates that the hash and the Golomb coding together reduce the overall memory usage, for example, of a language model.

Figure 5:
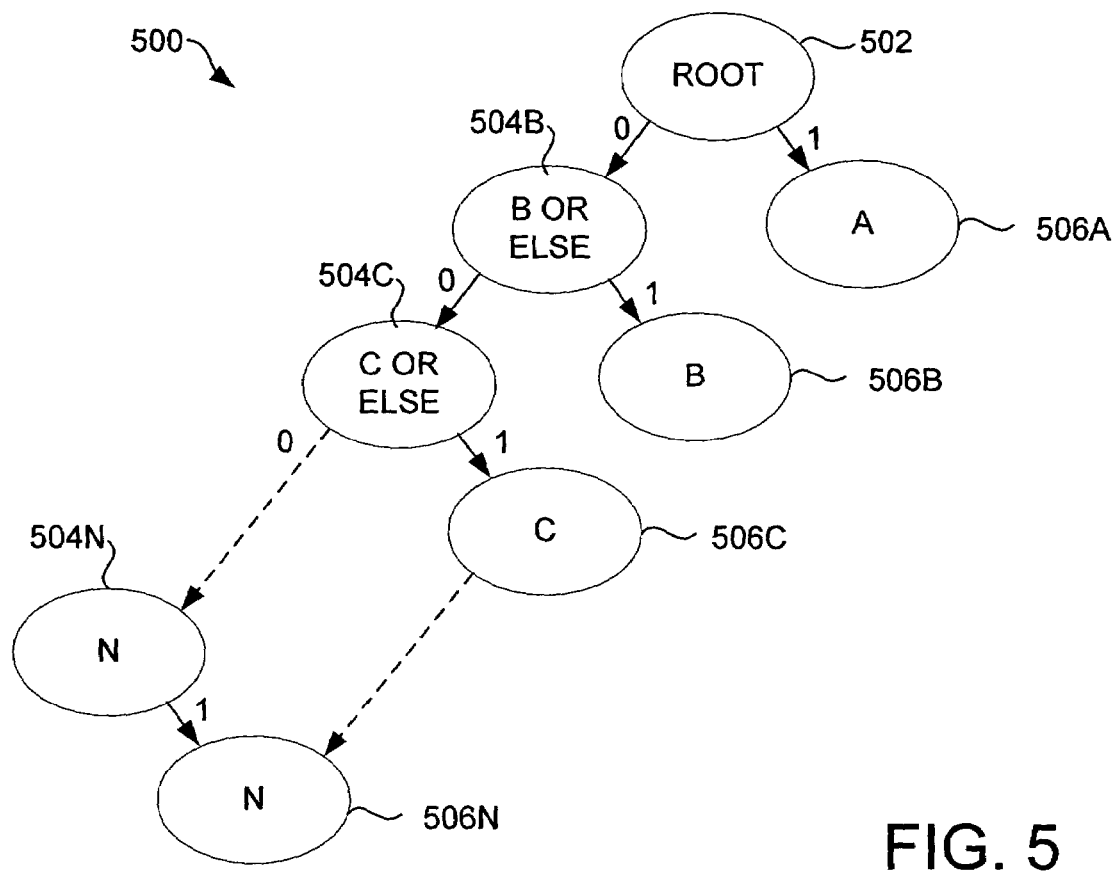
FIG. 5 is a simplified block diagram of a Huffman tree illustrating a unary code.

FIG. 5 is a simplified block diagram of a Huffman tree illustrating a unary code. In this instance, the symbol A has a probability of 0.5, while the symbol B has a probability of 0.25, and so on. Suppose the probability of x is:

$$Pr(x) = (1-B)B^x$$

with B=½. The graph 500 includes a plurality of nodes, with approximately equal probability assigned to each child of a node. The root node 502 represents the root word or symbol. The symbol is either an "A" or something else. If the symbol is an A, a value of "1" is assigned, corresponding to the path from root 502 to node 506A. The system then searches on the next bit or bit sequence. If the symbol is not an A, the system assigns a zero and then checks if the symbol is a B. If the symbol is a B, then the system assigns a 1 corresponding to the path from 504B to 506B. The resulting value for a symbol B is then "01", while the resulting value for a symbol A is "1". In general, the graph 500 illustrates a unary sequence of z-1 zeros followed by a 1.

TABLE 1 below illustrates a probability of a symbol based on its position within the graph relative to the root word.

TABLE 1

| Symbol | Code | Length | Pr |
|---|---|---|---|
| A | 1 | 1 | $2^{-1}$ |
| B | 01 | 2 | $2^{-2}$ |
| C | 001 | 3 | $2^{-2}$ |
| N | N (zeros) + 1 | N | $2^{-N}$ |

Figure 6:
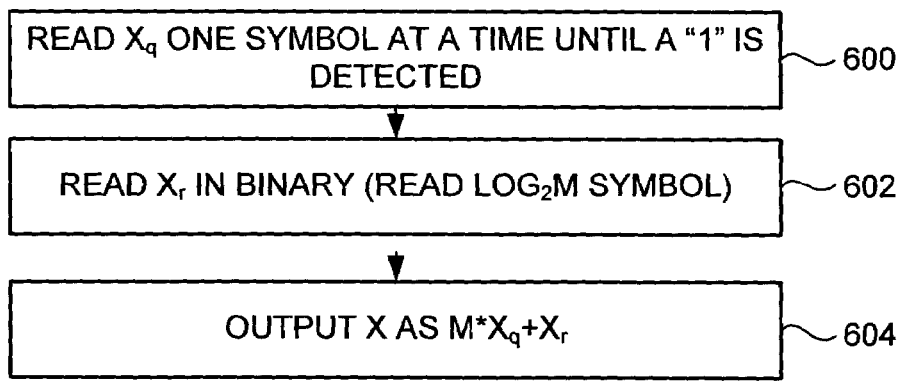
FIG. 6 is a simplified flow diagram of an embodiment of a process for decoding a Golomb coded first difference.

FIG. 6 is a simplified flow diagram of a process for decoding a Golomb coded first difference. The symbols of the quotient $X_q$ are read one bit at a time until a value of "1" is detected (step 600). The symbols of the remainder $X_r$ are read in binary (read $\log_2 M$ bits) (step 602). Finally, the first difference X is calculated from $X_q$ and $X_r$ as follows:

$$X_G = M \cdot X_q + X_r$$

which decodes the output $X_G$ (step 604). In this instance, the variable M represents a power of two approximately equal to the expected value of the first difference divided by two and rounded up to the nearest integer in the direction of positive infinity.

Figure 7:
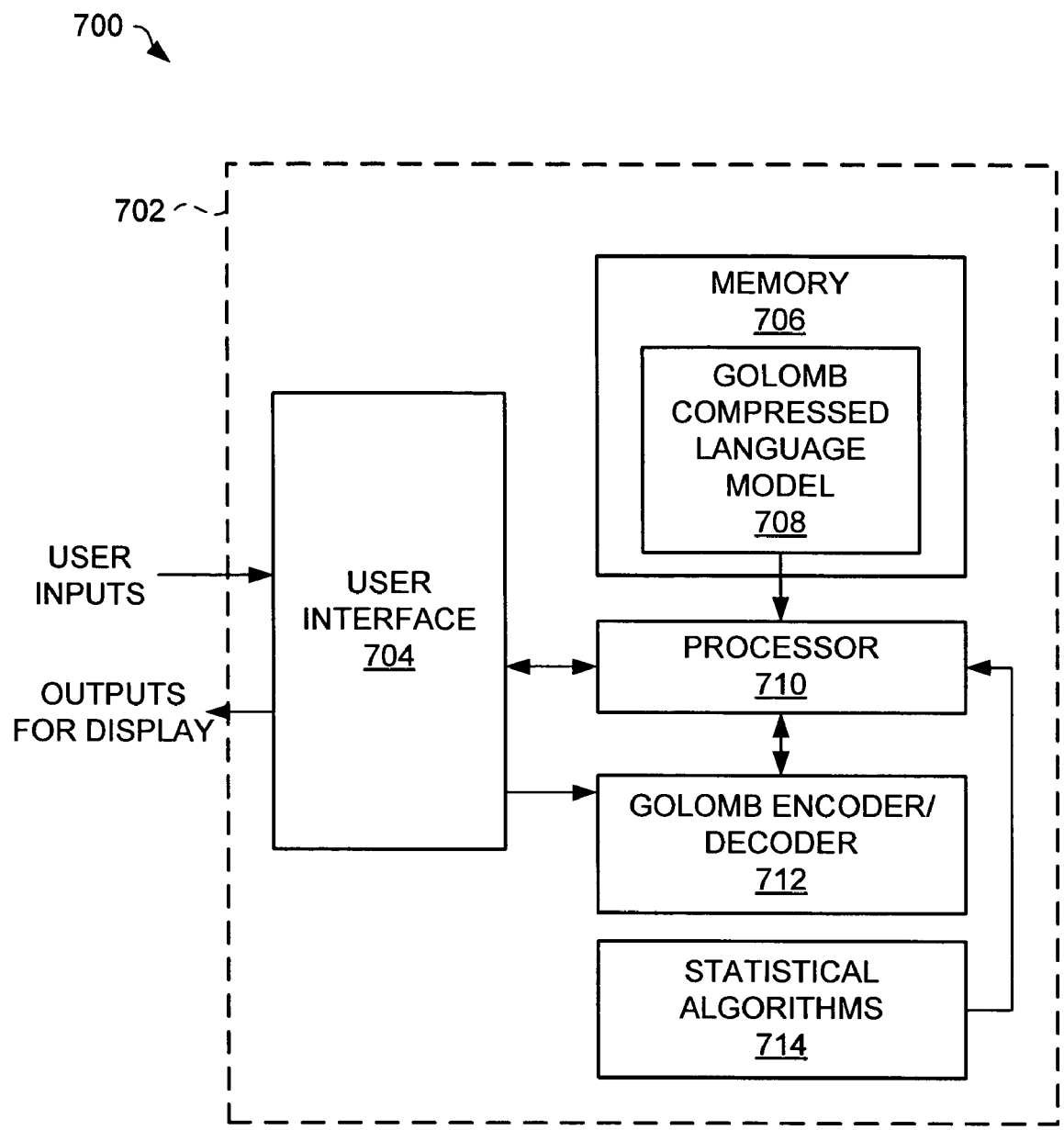
FIG. 7 is a simplified block diagram of an embodiment of a system adapted for using a language model compressed with Golomb coding techniques.

FIG. 7 is a simplified block diagram of an embodiment of a system 700 adapted to utilize Golomb coded language models. The system 700 includes a software application 702 with a user interface 704, a Golomb compressed language model 706 within a memory 708, a processor 710, a Golomb encoder/decoder 712, and a set of statistical algorithms 714. A user inputs data to the system 700 via the user interface 704. A Golomb encoder/decoder 712 encodes the user input and passes the encoded input to the processor 710, which analyzes the encoded input against the Golomb compressed language model 706 to produce a set of possible matches. The processor 710 uses the statistical algorithms 714 to select one or more probable matches based on the words within the compressed language model 706 and passes the one or more probable matches to the user interface 704 as outputs for display to the user.

TABLE 2 lists some parameter settings according to an embodiment of the present invention.

TABLE 2

| Click Throughs | N (URLs) | Average Delta (P/N) | 1/log(2) + log₂(P/N) | M (Memory) |
|---|---|---|---|---|
| 10 | 680,418 | 1,273 | 14 | 1,159,768 |
| 100 | 80,263 | 11,650 | 17 | 168,853 |
| 1000 | 5,888 | 55,701,699 | 29 | 21,383 |

Table 2 illustrates memory usage for one embodiment of Golomb coded hash values for URLs. Memory depends on both the number of URLs (N) and average delta (P/N). The table illustrates 3 settings of average delta, corresponding to 14-29 bits per URL. This type of compression makes it possible to incorporate large language models in portable devices.

In general, the language model can be used to assist a user in accessing information. For example, in a search engine, Golomb coding techniques can be employed to test alternate spellings of search terms provided by the user. In the context of a web browser on a portable device, Golomb compressions (coding/decoding) techniques can be adapted to test alternative URL values in order to correct for mistyped URLs.

Figure 8:
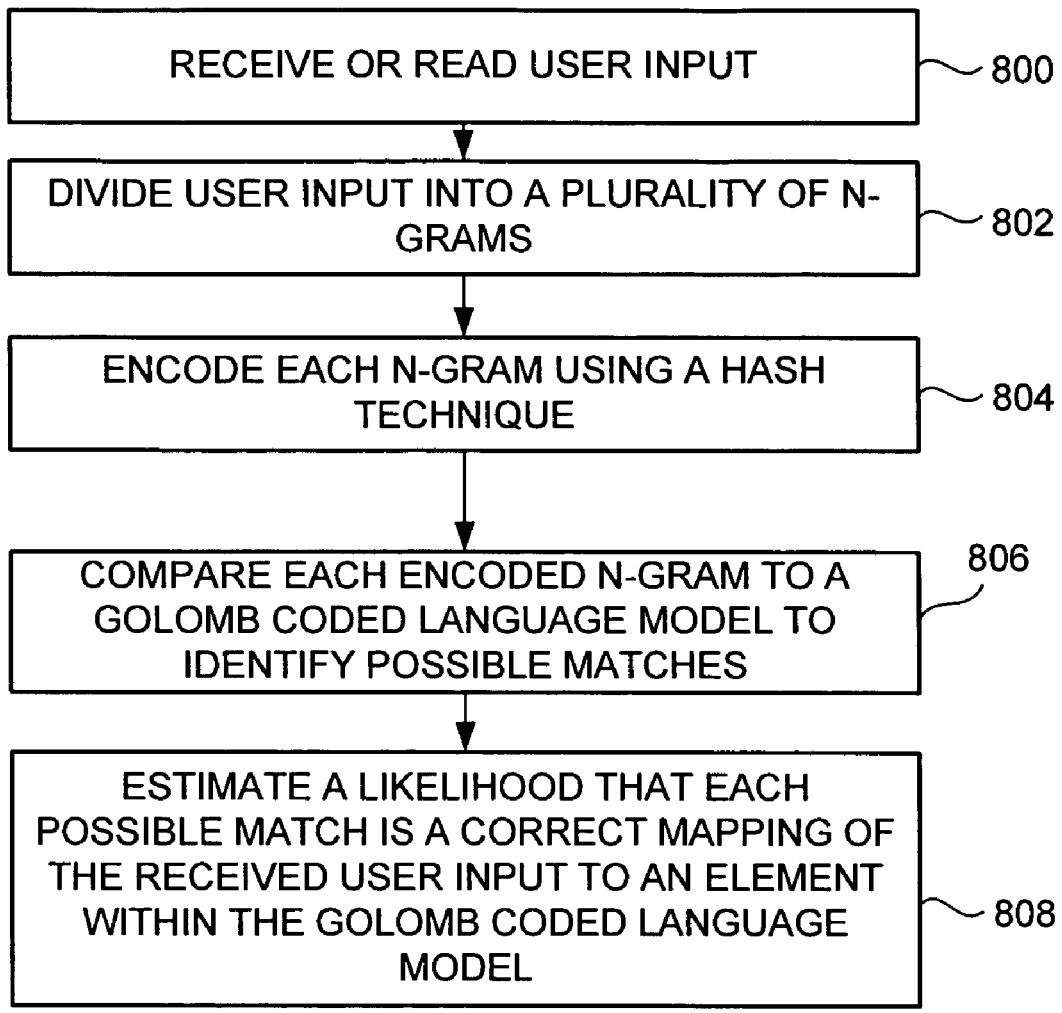
FIG. 8 is a simplified flow diagram of an embodiment of a process for decoding user input against a Golomb-encoded language model.

FIG. 8 is a simplified flow diagram of an embodiment for decoding a user input relative to a Golomb-coded language model. A user input is received or read, for example, symbol by symbol from a data stream, a file, or an input device (step 800). The user input is divided into a plurality of n-grams (step 802). Each of the plurality of n-grams are encoded using a hash technique (step 804). Each encoded n-gram is compared to the Golomb-coded language model to identify possible matches (step 806). A likelihood is estimated statistically for each possible match that the possible match is a correct mapping of the received user input to an element within the Golomb-coded language model (step 808). Any number of statistical algorithms can be applied to estimate the likelihood that a given match is correct. In general, each n-gram can be encoded using Golomb-encoding technique, such as that described above with respect to FIG. 4.

Although the present invention has been described with reference to particular embodiments, workers skilled in the art will recognize that changes may be made in form and detail without departing from the spirit and scope of the invention.

What is claimed is:

1. A method of compressing a language model comprising:
   generating a list of numerical values from n-grams of a user input;
   sorting the list of values;
   calculating differences between adjacent values in the list; and
   encoding each calculated difference using a Golomb code, by:
      choosing a value M to be approximately equal to half of an expected value of the calculated differences between adjacent values in the list;
      calculating a quotient value and a remainder value from the ratio of the calculated difference and the value M for each calculated difference; and
      storing the quotient value and the remainder value in a memory.

2. The method of claim 1 wherein the step of storing comprises:
   storing the quotient value in a unary format; and
   storing the remainder value in a binary format.

3. The method of claim 1 wherein the quotient value comprises a ratio of a first difference to the value M rounded down to a nearest integer value.

4. The method of claim 1 wherein the remainder value comprises a remainder of a ratio of a first difference to the value M rounded down to a nearest integer value.

5. The method of claim 1 further comprising:
   storing the encoded differences in a memory.

6. The method of claim 5 wherein the encoded differences occupy a number of bits (H) in the memory according to an equation $$H = N\left[\frac{1}{\log(2)} + \log_2\left(\frac{P}{N}\right)\right]$$

where N is a number of n-grams and P is a tradeoff value representing a selected tradeoff between memory usage and loss of language model content.

7. The method of claim 1 further comprising:
   storing computer readable instructions on a storage medium, the computer readable instructions defining the steps of generating, sorting, calculating and encoding.

8. A system for processing user inputs comprising:
   a user interface adapted to receive user inputs;
   a memory adapted to store information and to store a Golomb compressed language model;
   a Golomb encoder/decoder adapted to encode user input and to decode elements of the Golomb compressed language model wherein the Golomb encoder/decoder is adapted to calculate a value M based on an expected value of differences between hash values in a list of hash values, the Golomb encoder/decoder being adapted to calculate a quotient and remainder based on a ratio of the differences to the expected value; and
   a processor adapted to compare user input against elements of the Golomb compressed language model to identify probable matches.

9. The system of claim 8 further comprising:
   a set of statistical algorithms adapted for use by the processor to identify the probable matches.

10. The system of claim 8 wherein the processor is adapted to provide the identified probable matches to the user interface as outputs for display to a user.

11. The system of claim 8 wherein the processor is adapted to calculate numerical values related to user input and wherein Golomb encoder/decoder is adapted to encode the calculated numerical values.

12. A method of decoding a user input comprising:
   dividing a received user input into a plurality of n-grams;
   hashing each n-gram to obtain an n-gram hash value for each n-gram using a hash technique;
   Golomb encoding the n-gram hash values to obtain encoded n-grams;
   comparing each encoded n-gram to a Golomb coded language model to identify possible matches; and
   estimating statistically a likelihood that each possible match is a correct mapping of the received user input to an element within the Golomb coded language model;
   wherein comparing each encoded n-gram to a Golomb coded language model comprises:
      summing differences between encoded n-grams in the language model until a cumulative sum is equal to or greater than a value of the encoded n-grams; and
      associating the received user input with a value in the language model for an appropriate n-gram.

13. The method of claim 12 wherein the associated received user input comprises the possible match.

14. The method of claim 12 wherein the plurality of n-grams comprise a list of n-grams and wherein the step of Golomb encoding comprises:
   calculating a difference between adjacent n-gram hash values for n-grams in the list;
   choosing a value M for each calculated difference to be approximately equal to half of an expected value of the calculated difference between adjacent n-gram hash values in the list;
   calculating a quotient value and a remainder value from the ratio of the difference and the value M for each calculated difference; and
   combining the quotient value in unary format and the remainder value in binary format to form the encoded n-gram for each n-gram.

15. The method of claim 14 wherein the list of values comprises numerical values.

16. The method of claim 12 further comprising:
   storing computer readable instructions on a storage medium, the computer readable instructions defining the steps of dividing, encoding, comparing, and estimating.

17. A portable computing device, having a processor and memory, adapted to decode user input by comparing the user input against a Golomb-compressed language model according to the method of claim 12.

* * * * *